May 12, 1931.  J. A. ADELL  1,805,027
BAR HANGER
Filed Oct. 8, 1928
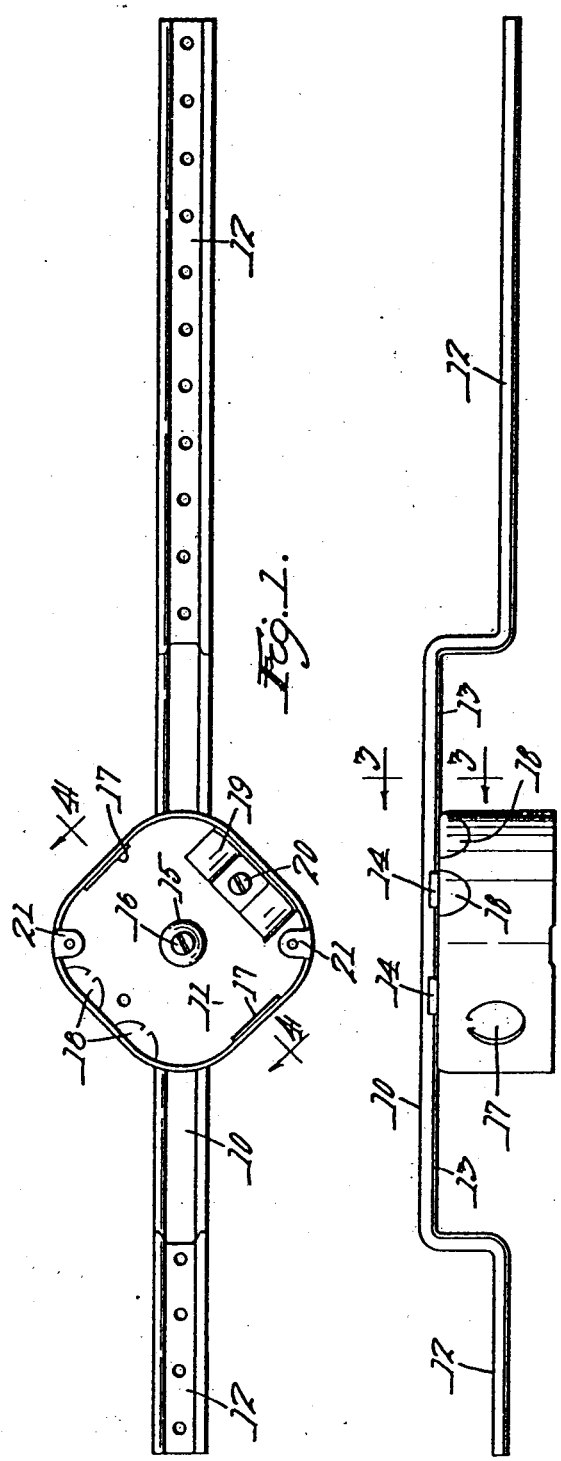
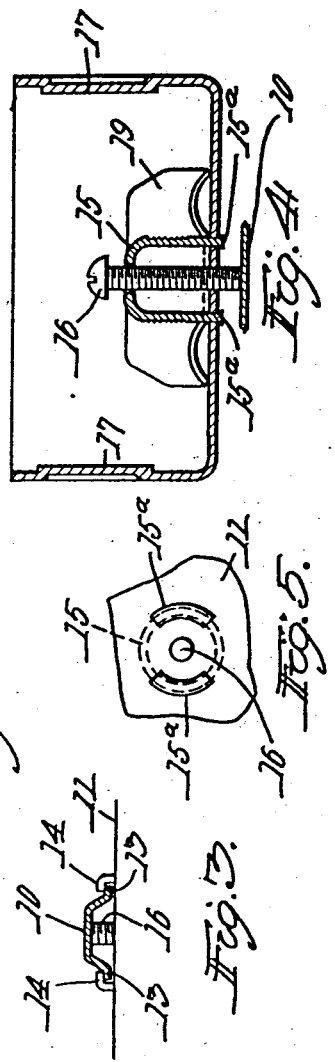
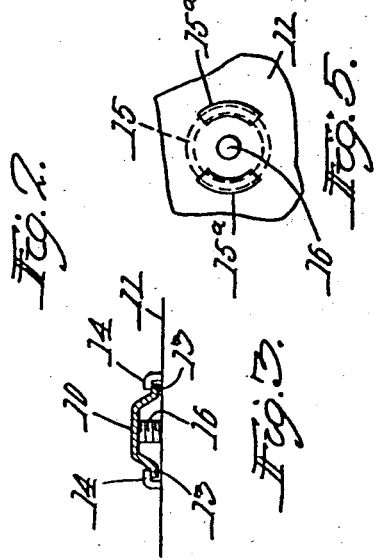

Patented May 12, 1931

1,805,027

UNITED STATES PATENT OFFICE

JOHN A. ADELL, OF ORANGE, MASSACHUSETTS

BAR HANGER

Application filed October 8, 1928. Serial No. 310,950.

This invention relates to a hanger for an outlet box.

The principal objects of the invention are to provide a construction for this purpose embodying a supporting bar and means for mounting the box slidably upon it in such a manner that there is no danger of the box coming off and to provide, in cooperation therewith, an extremely simple means for fastening the bar in position after adjustment.

Other objects and advantages of the invention will appear hereinafter.

Reference is to be had to the accompanying drawings in which

Fig. 1 is a bottom plan view of a bar hanger constructed in accordance with this invention;

Fig. 2 is a side view;

Fig. 3 is a sectional view on the line 3—3 of Fig. 2;

Fig. 4 is a sectional view on the line 4—4 of Fig. 1, and

Fig. 5 is a fragmentary plan of the box with the bar removed.

I have shown the support in the form of a bar 10, which has a straight portion along which the box 11 can be adjusted and is shown as having its ends 12 bent into a different plane for convenience in the matter of placing the box at the proper level. The bar is formed with a pair of integral flanges 13 which are flat and in the same plane and constitute means by which the box can be located on the bar.

The box is provided with a closed end and an open end. The box is made of a piece of sheet metal and formed by die stamping and is shown as substantially square in cross section with rounded corners. The closed end of the box is provided with two pairs of guides 14 punched out of the metal of the box and bent up into angular shape so as to encompass the flanges 13 and hold the box on the bar. The bar has to be slid in between the flanges 14 and then it can be adjusted relative to the box and vice versa.

For the purpose of holding the box in its adjusted position when that is obtained, a hollow threaded projection 15, also made of sheet stock, is secured to the closed end of the box inside it. The sheet metal member 15 is held in position by providing it with two projections 15ª extending through the closed wall of the box and riveted over on the outside. It is threaded to support an electric light or the like.

The projection 15 is provided with a passage in its end through which passes a screw 16. This screw also passes through a screw-threaded opening in the end of the box so that it can be forced against the supporting bar 10 as shown in Fig. 4. This binds the bar and secures the box in its adjusted position thereon so that the box will not become displaced accidentally. The fastening of the parts in position in this way by the simple operation of a screw driver is a great convenience in this industry because heretofore much time has been required for securing the box in its adjusted position.

The box is provided with usual knock-outs 17 which are shown on two opposite flat walls and is also provided with corner knock-outs 18 which project into the vertical wall and into the horizontal end of the box. These latter knock-outs constitute a convenient means for introducing a cable from certain positions and cooperate with fastening devices 19 inside the box, each secured by a screw 20. One of these is located adjacent to two of these corner knock-outs 18.

At the open side or bottom of the box there are a pair of ears 21 which are perforated for the purpose of fastening a cover on the box by means of screws.

This constitutes a very simple and convenient outlet box and support. It can be strung on its supporting bar very conveniently and then the supporting bar placed in position. After this, the box can be adjusted along the bar without trouble and without danger of the box falling away from it. Then the act of fastening the box to the bar is of the simplest nature and there is no danger of its being displaced accidentally thereafter.

Although I have illustrated and described only one form of the invention I am aware of the fact that modifications can be made therein by any person skilled in the art without departing from the scope of the invention as expressed in the claims.

Therefore, I do not wish to be limited in this respect but what I do claim is:—

1. In a bar hanger, the combination of a supporting bar having a pair of flanges at opposite sides in the same plane and an outlet box having two pairs of flanges formed integral therewith and projecting from the closed side thereof and bent inwardly toward each other in the same plane and spaced from the wall of the box sufficiently to allow the flanges of the bar to slide under them.

2. In a bar hanger, the combination of a bar having a pair of flanges at opposite sides and an outlet box having two pairs of flanges formed integral therewith and projecting from the closed side thereof and bent inwardly toward each other and spaced from the wall of the box sufficiently to allow the flanges of the bar to slide under them, whereby the box can be adjustably mounted on the bar, a screw in the center of the box adapted to be tightened against the bar to hold the box in position, and a hollow pressed metal screw-threaded member surrounding the first named screw and independent of said flanges on the box.

In testimony whereof I have hereunto affixed my signature.

JOHN A. ADELL.